F. H. SHARPE.
DIVIDER.
APPLICATION FILED MAY 26, 1919.

1,364,590.

Patented Jan. 4, 1921.
3 SHEETS—SHEET 1.

Inventor.
Frank H. Sharpe
by Heard Smith & Tennant
Attys.

Inventor.
Frank H. Sharpe
by Heard Smith & Tennant.
Attys.

UNITED STATES PATENT OFFICE.

FRANK H. SHARPE, OF BOSTON, MASSACHUSETTS.

DIVIDER.

1,364,590.  Specification of Letters Patent.  Patented Jan. 4, 1921.

Application filed May 26, 1919. Serial No. 299,774.

*To all whom it may concern:*

Be it known that I, FRANK H. SHARPE, a citizen of the United States, residing at Boston, county of Suffolk, State of Massachusetts, have invented an Improvement in Dividers, of which the following description, in connection with the accompanying drawing, is a specification, like characters on the drawing representing like parts.

This invention relates to dividers such as are used in bakeries for dividing from a dough mass portions of predetermined weight to be formed into loaves of bread, biscuits, etc., and the object of the invention is to provide an improved divider which is simple in construction, which is rapid and accurate in operation, which can be adjusted so as to divide portions of different predetermined weights from the dough mass, thus providing for the formation of loaves of different sizes, and which has various other features of advantage, all as will be more fully hereinafter set forth.

In order to give an understanding of my invention, I have illustrated in the drawings a selected embodiment thereof which will now be described, after which the novel features will be pointed out in the appended claims.

Figure 1:
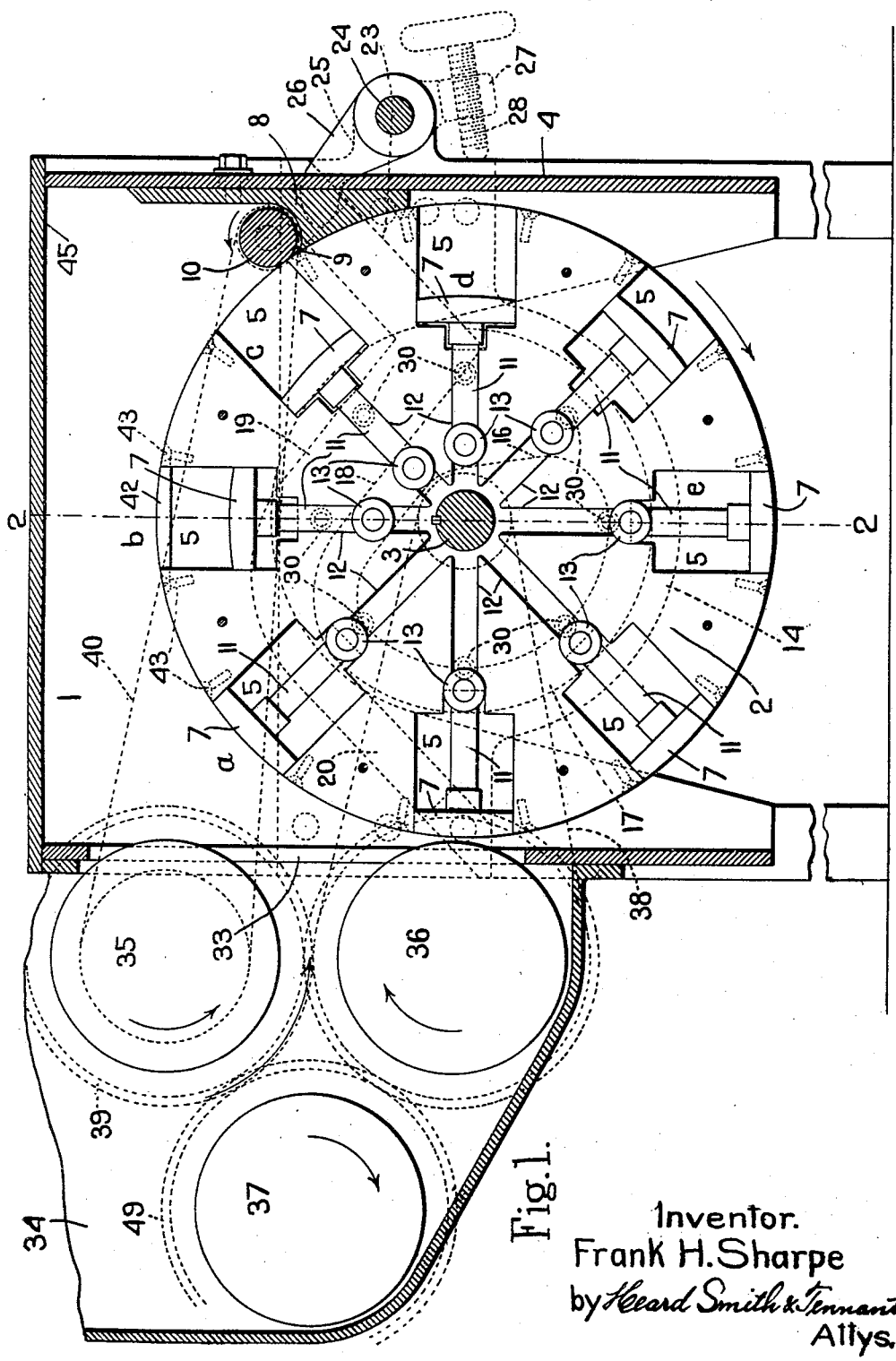
Figure 1 is a vertical sectional view through an apparatus embodying my invention taken on substantially the line 1—1, Fig. 2.

My improved divider comprises a dough-receiving receptacle into which the dough to be divided into smaller portions may be placed or fed, a dividing member provided with one or more pockets to receive the portions of dough divided from the dough mass in the receptacle, and means to produce a suction in each pocket thereby to assist in drawing the dough mass thereinto. I will also preferably subject the dough mass in the receptacle to slight pressure so that each pocket is filled with dough by the combined action of suction and pressure. The advantage of this is that the dough portion which is taken into each pocket and is thus divided from the dough mass is not subjected to sufficient pressure to break down its cellular structure and drive the gas out of it as would be the case if dough were forced into the pocket by pressure alone.

If the dividing operation is carried on in such a way as to subject the divided portions of dough to considerable pressure, such divided portion would become so compacted as to require considerable time to recover before it was ready for baking.

In the construction herein illustrated the receptacle which receives the dough mass is indicated at 1, it being herein shown as a box-like receptacle having an open bottom which is closed by the dividing element. This dividing element is illustrated as a rotary element 2 carried by a shaft 3 which is journaled in the frame 4 that supports the receptacle 1. This rotary element is provided with a plurality of pockets 5 in its periphery, and the construction is such that as the member 2 rotates, the various pockets are brought into communication with the receptacle 1. The member 2 extends from one side wall 6 of the receptacle 1 to the other, and the pockets 5 extend from one end to the other of the member 2. Each pocket is provided with a movable bottom 7 which is constructed to move from a position at the top of the pocket, as shown at the left-hand side of the member 2 in Fig. 1 inwardly to a position at the bottom of the pocket, as shown at the right-hand side of the member 2 in Fig. 1.

Means are provided for moving the pocket bottoms 7 inwardly and outwardly as the member 2 rotates. In the construction shown, said member 2 is intended to rotate in the direction of the arrow in Fig. 1, and the means for controlling the pocket bottoms is such that each bottom 7 will be at the outer end of the pocket when the pocket is brought into communication with the dough mass by the rotation of the dividing member 2, and when the pocket reaches about the position of the pocket *a* in Fig. 1, the bottom 7 will be drawn inwardly so that by the time said pocket reaches the position of the pocket *c*, the bottom will be at its maximum inward position. This inward movement of the bottom 7 creates a suction in the pocket which tends to draw the dough thereinto from the dough mass in the receptacle 1, and if the dough mass is subjected to a slight pressure, then by the time that each pocket has reached the position indicated by the pocket c, it will be filled with dough.

The receptacle is provided with a scraper element 8 having a cutting edge 9 which operates to sever the portion of the dough in the pocket from the dough mass as the member 2 rotates, and, therefore, as each pocket passes the scraper 9, it will carry with it a divided portion of dough equal in volume to that of the pocket.

I may if desired employ a positively-driven wiper roll 10 adjacent the scraper 8 to assist in holding the dough in the pocket as it is being divided from the dough mass by the scraper. This wiper roll will be rotated in the direction of the arrow, Fig. 1, and is preferably rotated at a greater surface speed than that of the dividing element. The action of this roll is to hold the dough in the pocket as the latter is passing the scraper, the rolling action of the roll on the dough serving to hold it in the pocket.

After each pocket has been carried past the scraper 8 into the position of the pocket d, then the pocket bottom begins to move outwardly thereby to expel the divided dough mass therefrom, and by the time the pocket reaches a point directly underneath the member 2, as indicated by the pocket e, the bottom will be at the open end of the pocket and the dough mass will have been ejected from the pocket. Inasmuch as there are a plurality of pockets in the member 2 and the latter may be continuously rotated, this operation of dividing portions of dough from the dough mass in the receptacle 1 is a continuous operation.

Any suitable means for operating the pocket bottoms 7 may be employed without departing from my invention. In the construction shown, each pocket bottom 7 is provided with two arms 11 which extend radially inwardly toward the center of the member 2 and which operate in and are guided by suitable radial guiding grooves 12 formed in the ends of the member 2. Each arm 11 is provided with a laterally-extending roll 13 which is acted upon by a suitable cam device by which the pocket bottom is given its radial movement. There is a cam device on each side of the machine, each cam device being carried by a side plate or member 14 which constitutes the side of the frame and which also provides the bearings 15 in which the shaft 3 is journaled. Each member 14 is provided with a cam portion 16 by which the pocket bottoms are moved outwardly, a cam groove 17 in which the rolls 13 travel while the pockets are passing from the position shown at e to that shown at a, and a cam surface 18 which engages the rolls as they pass from the position a to the position c and by which the pocket bottoms are forced inwardly.

Figure 4:
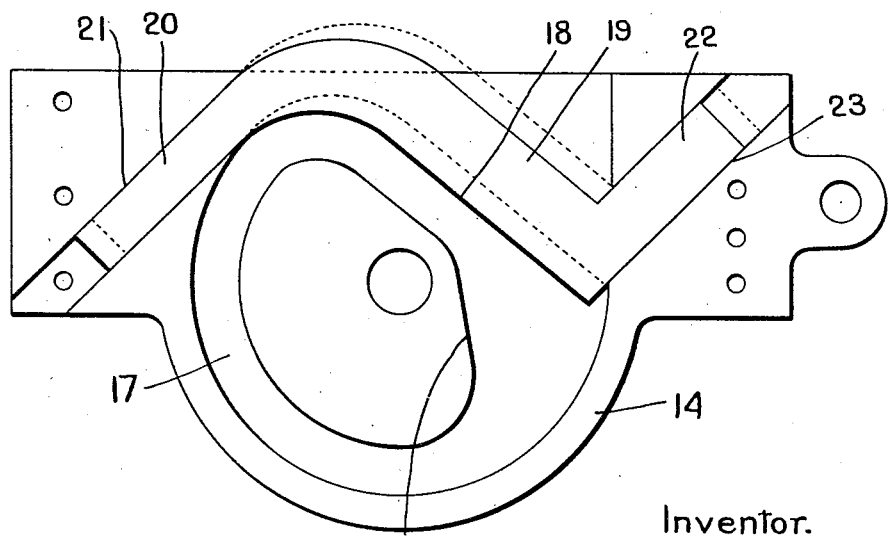
Fig. 4 is a fragmentary view showing the cam for controlling the dividing operation.

The cam surface 16 is a fixed stationary surface and the cam surface 18 will preferably be made adjustable thereby providing means for varying the maximum capacity of the pockets. This cam surface 18 is shown as formed on a cam member 19 which is provided at one end with a guiding extension 20 which is slidably mounted in a groove 21 formed in the member 14, and the other end is provided with another guiding extension 22 parallel with the extension 21 and operating in a guiding groove 23 also formed in the member 14. The cam member 19 can thus be adjusted in the guiding grooves 21 and 23 so as to place the cam surface 18 nearer to or farther from the center of rotation. In Fig. 1 the cam member is indicated as adjusted inwardly to its maximum extent thereby to bring the cam face 18 into such a position that the pocket bottoms will be withdrawn inwardly to their greatest extent when each pocket reaches substantially the position indicated at c. If the cam member 18 is adjusted outwardly from the position shown in Fig. 2, or into the dotted line position Fig. 4, then each pocket bottom will be drawn inwardly to a less extent and, therefore, a less volume of dough will be drawn into each pocket. The adjustment of the cam member 19, therefore, provides means whereby the amount of dough to be placed in each pocket can be adjusted according to the size of the loaf desired.

While any appropriate means for controlling the position of or adjusting the cam 19 may be employed, I have herein shown a rock-shaft 24 journaled in bearings 25 carried by the frame, and having fast thereon fingers 26 which engage the ends of the extensions 22. One of the fingers 26 is provided with a projection 27 carrying a set-screw 28 which is adapted to have bearing on the frame 4. The action of the rolls 13 against the cam face 18 will tend to force the cam 19 outwardly, and the stop fingers 26 provide means for limiting each outward movement of the cam and controlling the position which the cam face 18 will occupy.

Each arm 11 is acted upon by a friction plug 30 which is received in a recess formed in the element 2 and is acted upon by a suitable spring 31 that tends to force the friction plug outwardly into frictional contact with the arm 11. These friction plugs 30 operate to frictionally hold the pocket bottom 7 in any position in which they will be left by the cams 16 or 18.

Figure 2:
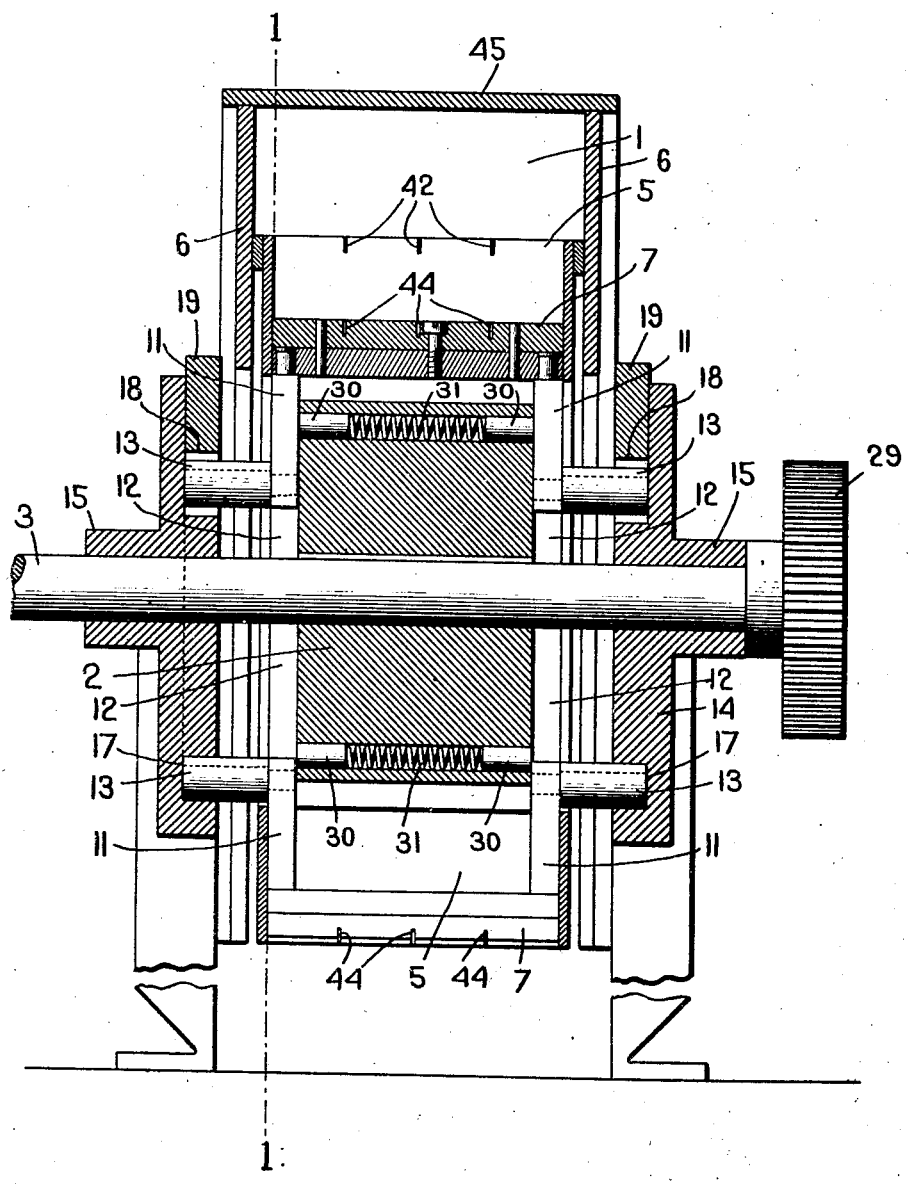
Fig. 2 is a sectional view taken on the line 2—2, Fig. 1.
Figure 3:
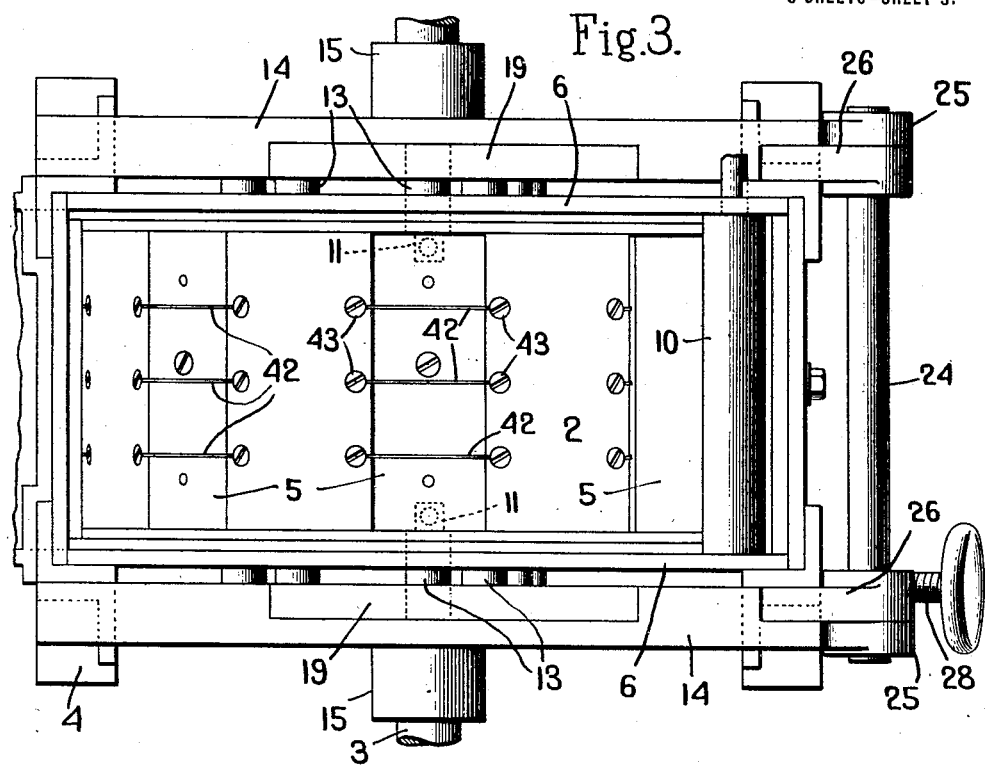
Fig. 3 is a top plan view.

The shaft 3 may be driven by any suitable means, and in Fig. 2, I have indicated a driving gear 29 thereon.

Various ways may be provided for delivering the dough to the receptacle 1 without departing from my invention. In Fig. 1, I have shown an arrangement wherein said receptacle has a side feed. Said receptacle is formed with the open side 33 which communicates with a hopper 34 having the feed rolls 35, 36 and 37 therein, said rolls being driven in the direction of the arrows thereon in any suitable way and operating to feed the dough mass into the receptacle through the open side 5. The advantage of this form of feed is that the dough is fed into the receptacle 1 in the direction in which the pockets are moving as they are being filled so that as the pockets pass from the position a to position b, they are moving with the dough which is being fed into the receptacle, and at the same time a portion of the dough from the dough mass is being drawn into the pockets. These feed rolls 35, 36, 37 may be driven by any suitable means. I have illustrated the roll 36 as being driven from the shaft 3 by means of a suitable sprocket chain 38, the feed roll 35 as being geared to and driven from the roll 36 by the gears 39, and the roll 37 as being geared to and driven from the roll 35 by the gear 49. The roll 10 may be driven from the gear 35 by means of a suitable sprocket chain 40.

In practice I propose to so operate the feed rolls that the dough will be fed into the receptacle at such a rate as to maintain said receptacle substantially full, and to maintain the dough therein under a slight pressure. The operation of filling the pockets, therefore, is the result of the suction produced by the receding bottoms 7 and the slight pressure with which the dought is fed into the receptacle.

If it is desired to divide the dough mass into portions suitable for forming loaves, then the entire quantity of dough which is taken into each pocket will constitute the material for one loaf. If it is desired to divide the dough into smaller portions, suitable for biscuits or rolls, I propose to provide each pocket with a plurality of knife elements 42 which extend transversely across the open edge of the pocket, said knife elements operating to sub-divide the amount of dough which is taken into each pocket into smaller portions, each one of which is of the right amount for a biscuit or roll. These knife elements 42 may be removably held in position by means of screws 43 so that they can be removed if they are not needed.

The pocket bottoms 7 are provided with slots 44 into which the knives 42 are received when said bottoms are at the outer extremity of their movement. The receptacle 1 is provided with a cover or top 45 which will preferably be removably secured in place so that it can be readily removed whenever it is desired to gain access to said receptacle.

From the above it will be seen that my invention provides a divider which is continuous in its action inasmuch as the rotary movement of the dividing element is a continuous one. Furthermore, the method by which the dough is handled in the machine is such that none of the gases in the dough mass are expelled therefrom during the dividing operation so that it is not necessary to let the divided portions rest or recover for any great length of time before they are formed into the desired shape and are ready for baking.

I claim:

1. In a divider, the combination with a dough-receiving receptacle having an open side, of a dividing member closing said side and having a pocket provided with a movable bottom, means to move the member to cause the pocket to travel across said open side and in communication therewith, means operating during such travel to move the bottom positively from its outer to its innermost position thereby to draw dough into the pocket, and feeding rolls to feed dough into said receptacle as it is drawn into the pocket and at such a rate as to maintain the dough under slight pressure in the receptacle.

2. In a divider, the combination with a dough-receiving receptacle having an open side, of a dividing member closing said side and having a pocket provided with a movable bottom, means to move the member to cause the pocket to travel across said open side and in communication therewith, means operating during such travel to move the bottom positively from its outer to its innermost position thereby to draw dough into the pocket, and feeding rolls to feed dough into the receptacle in the general direction of the travel of the pocket across the open side of the receptacle and at such a rate as to maintain the dough in the pocket under slight pressure.

3. In a divider, the combination with a dough-receiving receptacle having an open bottom, of a rotary dividing member closing said bottom and having a plurality of pockets, each provided with a plunger or movable bottom, means to rotate said dividing member to cause the pockets to travel transversely across the bottom of the receptacle, means to move the pocket of each bottom inwardly positively from its outer to its inner position while it is in communication with said receptacle, the latter having a feed opening in its side, and feed rolls to feed dough into the receptacle through said side in the direction of the travel of the pockets whereby each pocket is filled partly by the suction caused by the inward movement of the pocket bottom and partly by the pressure caused by the feeding of the dough into the receptacle.

4. In a divider, the combination with a frame having two side plates each having a cam groove, of a dough-receiving receptacle carried by said frame and situated between the side plates, a rotary dividing member journaled in the frame and extending from one to the other side of said receptacle, said dividing member having a plurality of pockets, a plunger in each pocket, each plunger having inwardly directed stems, projections extending outwardly from said stems beyond the sides of the receptacle and into the cam grooves whereby the rotation of the dividing member causes the plungers to move positively both inwardly and outwardly, that portion of the wall of each cam groove, which acts on the projection to move the plunger inwardly toward the center of the dividing member, being adjustable radially.

5. In a divider, the combination with a frame comprising two side plates each having a cam groove, of a dough-receiving receptacle carried by said frame, a rotary divider journaled in the frame and extending from one side to the other of the receptacle, said divider having a plurality of radially arranged pockets, a plunger in each pocket, projections extending from said plungers and operating in said cam grooves whereby rotation of the dividing element causes the plungers to move inwardly and outwardly, the portion of each side plate forming that portion of the wall of the cam groove, which operates to move the plungers inwardly, being adjustable radially, and having at its ends parallel guiding extensions which are received in guiding grooves in said side plates and means to hold each adjustable member in adjusted position.

In testimony whereof I have signed my name to this specification.

FRANK H. SHARPE.